United States Patent [19]
Mukainakano

[11] Patent Number: 5,990,663
[45] Date of Patent: Nov. 23, 1999

[54] CHARGE/DISCHARGE CONTROL CIRCUIT AND CHARGING TYPE POWER-SUPPLY UNIT

[75] Inventor: Hiroshi Mukainakano, Chiba, Japan

[73] Assignee: Seiko Instruments Inc., Japan

[21] Appl. No.: 08/873,790

[22] Filed: Jun. 12, 1997

[30] Foreign Application Priority Data

Jun. 14, 1996 [JP] Japan ................................. 8-154578

[51] Int. Cl.[6] .................................................... H02J 7/00
[52] U.S. Cl. ......................... 320/134; 320/136; 320/163; 320/164
[58] Field of Search .................................. 320/128, 134, 320/136, DIG. 13, 162, 163, 164, 165

Primary Examiner—Peter S. Wong
Assistant Examiner—K. Shin
Attorney, Agent, or Firm—Adams & Wilks

[57] ABSTRACT

To enhance the performance as well as the reliability and safety of a charge/discharge control circuit and a charging type power-supply unit using it, a charge/discharge control circuit 102 is made to have a circuit construction wherein when a load 109 has been connected at a time of a secondary cell 101 being charged and being in a state having been protected from the charging operation, the state of protection from the charging operation is released to thereby make a switch circuit 103 "on" and permit effective performance of the discharging operation while, on the other hand, when a transition occurs from even this state to a state where excess current is consumed from the secondary cell 101 and as a result an excessive amount of current flows through the switch circuit 103, control can be made so that the discharging from the secondary cell 101 may be stopped, thereby enabling avoidance of the FETs from breakage.

5 Claims, 14 Drawing Sheets

CHARGE/DISCHARGE CONTROL CIRCUIT AND CHARGING TYPE POWER-SUPPLY UNIT

BACKGROUND OF THE INVENTION

The present invention relates to a charge/discharge control circuit which can control electrical charge or discharge of a secondary cell by turning a switch circuit "on" or "off" and a charging type power-supply unit that utilizes the charge/discharge control circuit.

Apower-supply unit whose circuit block diagram is illustrated in FIG. 2 is known as a conventional charging type power-supply unit that is composed of a secondary cell. This structure is disclosed in, for example, Japanese Patent Application Laid-Open Publication No. 4-75430, "Power-Supply Unit Of Electrical Charge Type". That is, a secondary cell 101 is connected through a switch circuit 103 to a −VO terminal 105 or +VO terminal 104 which is an external terminal. Further, a charge/discharge control circuit 102 is connected in parallel with the secondary cell 101. This charge/discharge control circuit 102 has a function of detecting the voltage of the secondary cell 101. Either in a case where the secondary cell 101 is in a state of overcharge (a state where the cell voltage value larger than a prescribed voltage value. This state is hereinafter referred to as "an overcharge protection state") or in a case where the secondary cell 101 is in a state of over-discharge (a state where the cell voltage is smaller than a prescribed voltage value. This state is hereinafter referred to as "an over-discharge protection state"), a signal is output from the charge/discharge control circuit 102 so as to turn the switch circuit 103 "off". By stopping the electrical discharge when the voltage of the +VO terminal 104 has reached a certain level of voltage, it is possible to limit the current that flows through the switch 103. That is, when an excessive amount of current is plowing, it is possible to stop the electrical discharge for a (control of excess current). This state is hereinafter referred to as "an excess current protection state". Between the +VO terminal 104 and −VO terminal 105 there is connected an electrical charger 108 for electrically charging the secondary cell 101 or a load 109 that uses the energy of the secondary cell 101.

As another example of the conventional charging type power-supply unit that is composed of a second cell, there is also known a power-supply unit such as that illustrated in a circuit block diagram of FIG. 3. This circuit is one wherein the switch circuit 103 illustrated in FIG. 2 is connected in series with a negative electrode 111.

However, the charge/discharge control circuit that has been constructed as mentioned above has the following drawbacks when a load is connected in the electrical overcharge protection state.

In general, the switch circuit 103 uses two FETs (Field Effect Transistor). As another embodiment wherein this switch circuit is used, there is also known a power-supply unit such as that illustrated in a circuit block diagram of FIG. 4. In the embodiment of FIG. 4, the switch circuit 103 is composed of two FETs, i.e., FET-A 112 and FET-B 113.

In the electrical over-discharge state, the charge/discharge control circuit 102 operates so as to turn the FET-A 112 "off" and, in the electrical overcharge state, operates so as to turn the FET-B 113 "off". For this reason, a signal line for controlling the switch circuit is divided into two parts 107A and 107B. Also, in the excess current state, the control circuit operates so as to turn the FET-A 112 "off".

When, in such a circuit, the load is connected to the cell which is in a state of electrical overcharge as illustrated in FIG. 5, since the FET-B 113 is "off", the discharge current flows through a parasitic diode. For this reason, even when the current that is consumed by the load is small, the voltage of the −VO terminal 105 rises necessarily by the forward voltage Vf of the parasitic diode. Since the representative value of the parasitic diode Vf existing in the FET-B 113 is approximately 0.6 V, the voltage of the −VO terminal 105 becomes higher than the excess current detection voltage. Since when the excess current detection voltage is lower than Vf the connecting of the load in the electrical overcharge state results in the state of electrical overcharge and excess current, both the FET-A 112 and the FET-B 113 go "off", with the result that while the electrical charge is stopped, the electrical discharge made with respect to the load is also interrupted. This indicates that while on one hand the cell voltage is in a state of electrical overcharge and therefore is maintained to have an appreciably high level of voltage, on the other hand electrical discharge becomes disabled immediately after the load has been connected to the cell. Since after the electrical charge is effected the electrical discharge is disabled, the secondary cell completely malfunctions.

When the excess current detection voltage is set to be at a higher value, it results that the current that flows through the FETs becomes large in magnitude with the result that the function of the excess current protection ceases to be performed.

SUMMARY OF THE INVENTION

In view of the above, it is the object of the present invention to obtain a highly reliable, safe and high-in-performance charge/discharge control circuit which when in the state of electrical overcharge protection the load has been connected can promptly release the electrical overcharge protection state and promptly start the performance of the electrical discharge and can also lessen the loss made by the switch circuit and thereby effectively perform the electrical discharge, and which when with the load being connected the load current is abnormal, stops the performance of the electrical discharge, as well as a charging type power-supply unit which uses this charge/discharge control unit.

In order to attain the above object, the present invention has been arranged to have a Circuit construction wherein, in the charge/discharge control circuit and the charging type power-supply unit using it, when in the electrical overcharge protection state of the electrically charged secondary cell, the load has been connected thereto, the electrical overcharge state is released and the switch circuit is turned "on" to thereby enable effective performance of the electrical discharge, and wherein when from even this state an excessive amount of current is consumed from the secondary cell and reaches the excess current state where an excessive amount of current flows into the switch circuit, the electrical discharge from the secondary cell to the load can be stopped, thereby enabling the avoidance of the FET breakage.

In the above-constructed charge/discharge control circuit and charging type power-supply unit using it, when, after the detection of the electrical overcharge, the load has been connected, also, since no loss is made in the switch circuit, it is possible to obtain a high-in-performance secondary cell because of enabling the prolongation of the service life thereof while, on the other hand, when abnormal current has occurred, since the electrical discharge can be promptly stopped, the operation is so performed as to prevent the breakage of the switch circuit, secondary cell, etc., to thereby enhance the reliability of the entire equipments and also enhance the safety thereof.

DETAILED DESCRIPTION OF THE PREFERRED EMBODIMENTS

Embodiments of the present invention will be explained hereafter with reference to the drawings.

Figure 1:
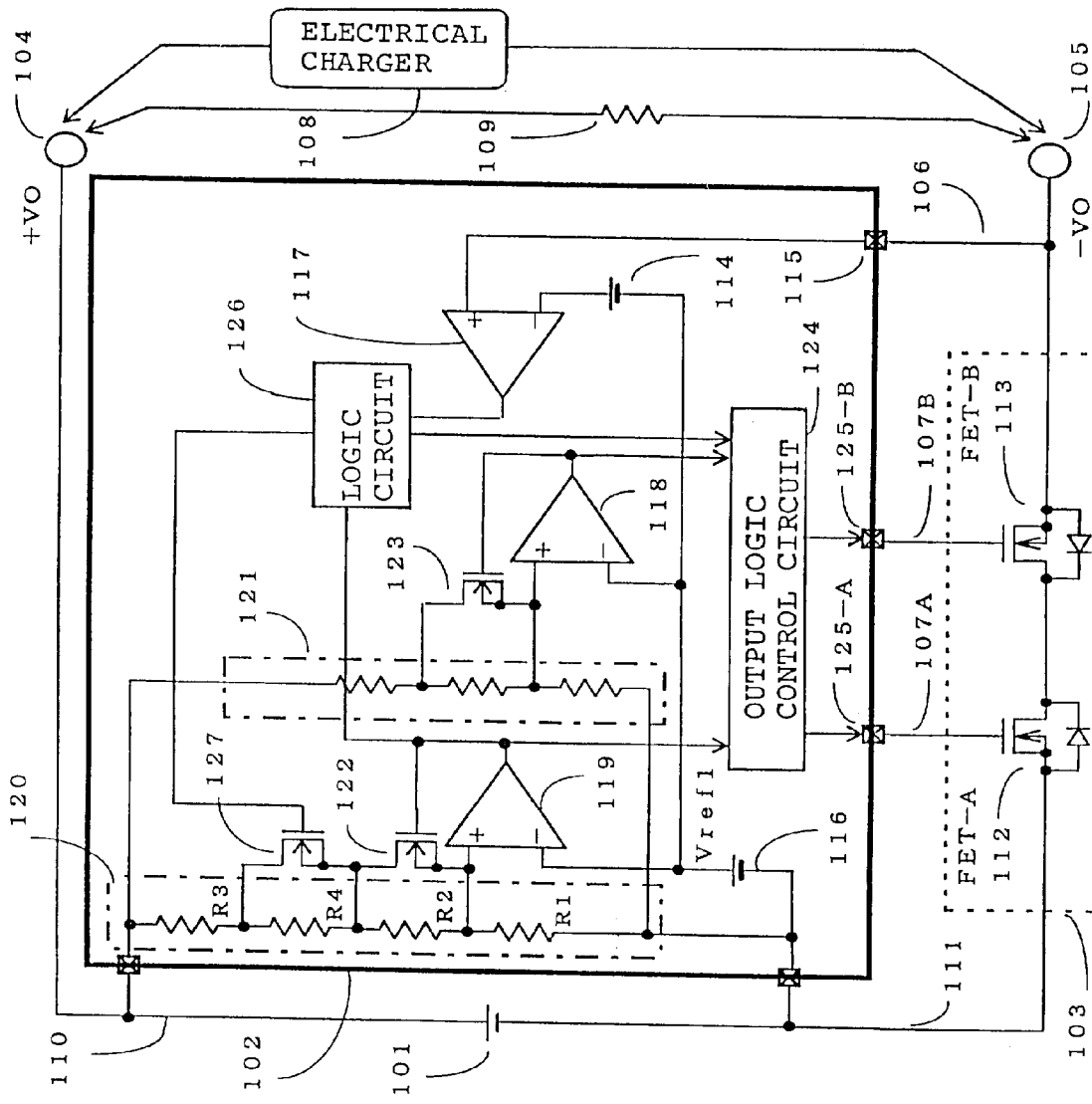
FIG. 1 is an explanatory view illustrating circuit blocks of a charging type power-supply unit according to the present invention.

FIG. 1 is a circuit block diagram illustrating a charging type power-supply unit that includes a circuit block diagram of a charge/discharge control circuit according to the present invention. To a −VO terminal 105 there is connected a secondary cell 101 through a switch circuit 103. The switch 103 is composed of two N-ch FETs 112, 113. The voltage of the secondary cell 101 is detected by a charge/discharge control circuit 102. The charge/discharge control circuit 102 is composed of an overcharge detecting comparator 119, an over-discharge detecting comparator 118, an excess current detecting comparator 117, a reference voltage circuit A 116, a reference voltage circuit B 114, a voltage dividing circuit 120, a voltage dividing circuit 121, an output control logic circuit 124, etc. The charge/discharge control circuit 102 is connected to the switch circuit 103 by way of signal lines 107A and 107B, whereby an "on"/"off" signal for turning the switch circuit "on" or "off" is supplied from the control circuit 102 to this switch circuit. An electrical charger 108 for electrically charging the secondary cell 101 or equipment capable of being driven by the secondary cell (a load 109 as viewed from the secondary cell) is connected between a +VO terminal 104 and the −VO terminal 105. In this figure, a FET-A 112 and a FET-B 113 are connected in series with the −VO terminal 105. However, the FET-A 112 and FET-B 113 may be connected instead to the +VO terminal 104.

The overcharge detecting comparator 119 and the over-discharge detecting comparator 118 each have a function of comparing the voltage of the secondary cell 101 and the voltage of the reference voltage A 116. Since the output control logic circuit 124 supplies signals to terminals 125A and 125B according to the output signals from the respective comparators, the gate voltages of the respective FETs change in level according to their respective states, with the result that electrical charge or discharge into or from the secondary cell 101 can be turned "on" or "off". For example, when a state of overcharge occurs, the voltage of a plus input terminal of the overcharge detecting comparator 119 becomes higher than the voltage of the reference voltage A 116, with the result that the output of this comparator is inverted from Low to High. When this inverted output signal is input to the output control logic circuit 124, this output control logic circuit 124 changes the signal line 107B from High to Low. As a result, the gate voltage of the FET-B 113 of the switch circuit 103 changes from High to Low, with the result that the FET-B is turned "off". As a result, electrical charge current ceases to flow into the secondary cell 101 and thus the charging is stopped.

The excess current detecting comparator 117 compares the voltage of the −VO terminal 105 with the voltage of the reference voltage B 114 and thereby outputs a signal that stands on their respective states, this signal being input to the output control logic circuit 124. At the time of the excess current protection state, the output control logic circuit 124 supplies a signal to the FET-A 112 which stops the performance of the electrical discharge.

For explaining the effectiveness of the construction illustrated in this embodiment, first, an explanation will be given of the operation in each of the respective protection states that is performed when FETs have been employed in the switch circuit.

Figure 6:
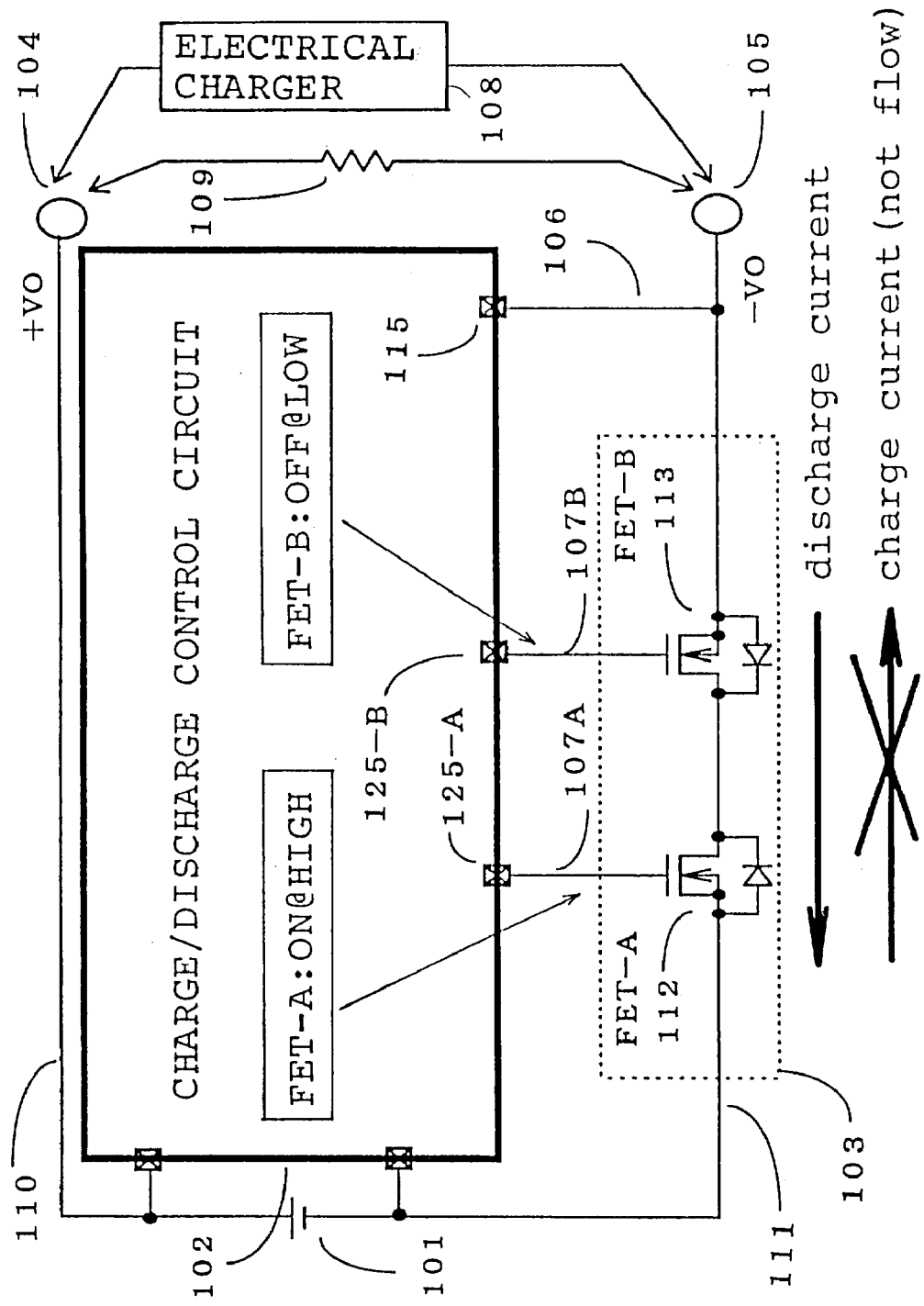
FIG. 6 is a view illustrating a state of overcharge in the charging type power-supply unit.

FIG. 6 illustrates the electrical overcharge protection state when FETs have been employed in the switch circuit. In the electrical overcharge state, the FET-A 112 goes "on" and the FET-B 113 goes "off". If at this time, the electrical charger 108 is connected the voltage of the −VO terminal 105 becomes lower than the voltage of the negative electrode terminal 111 of the secondary cell, and no electrical charge occurs with respect to the secondary cell 101. However, since when at the time of electrical overcharge the load is connected the voltage of the −VO terminal 105 becomes higher than the voltage of the negative electrode terminal 111 of the secondary cell, current flows from the secondary cell 101 to the load through a parasitic diode of the FET-B 113. That is, in the electrical overcharge protection state that occurs after the detection of the electrical overcharge, electrical discharge is possible though electrical charge is disabled.

Figure 7:
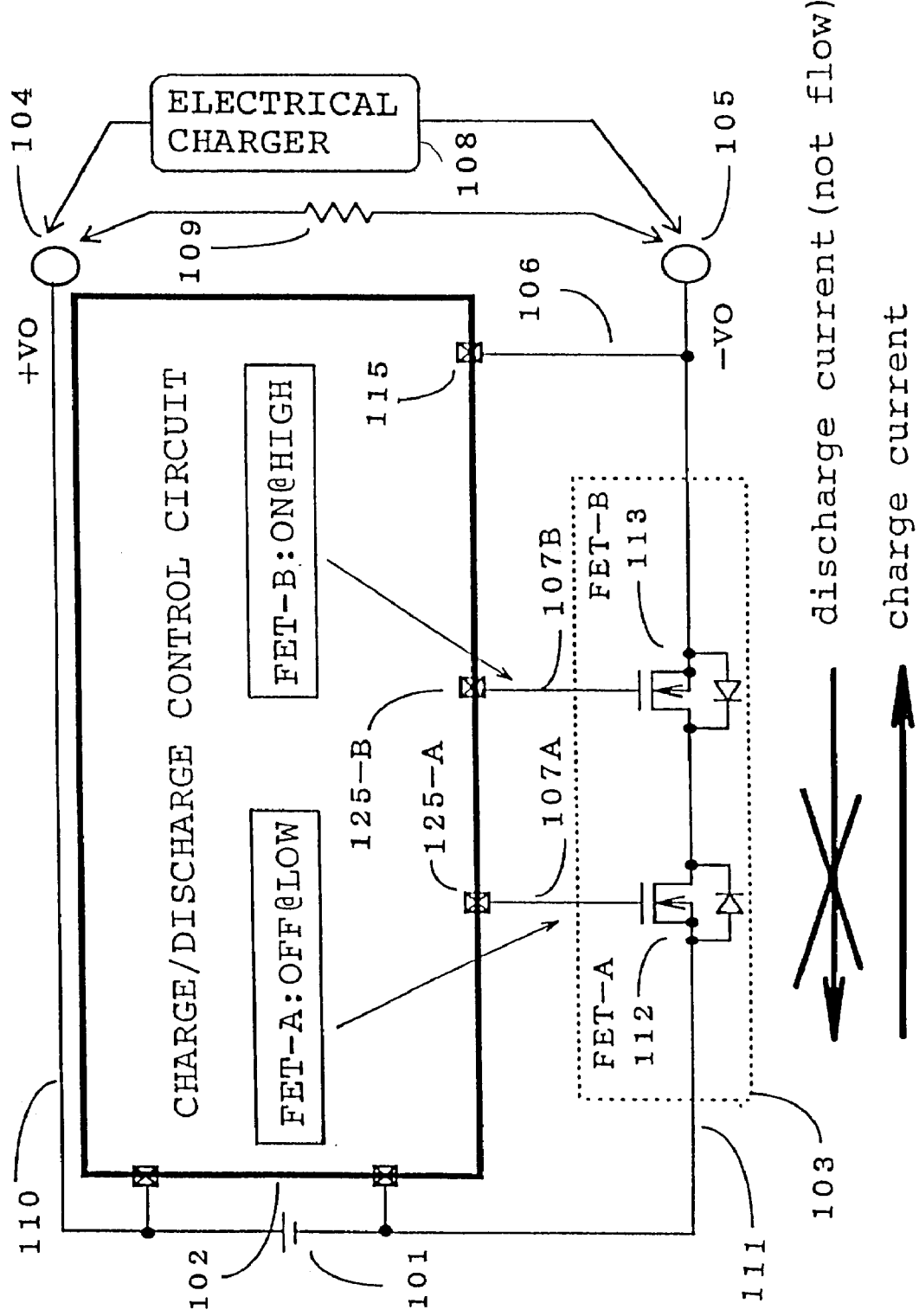
FIG. 7 is a view illustrating a state of over-discharge in the charging type power-supply unit.

In the electrical over-discharge protection state and excess current protection state, the story is reversed. This is illustrated in FIG. 7. The FET-B 113 goes "on" and the FET-A 112 goes "off", with the result that electrical discharge from the secondary cell 101 to the load 109 ceases to be performed. However, in a case where the electrical charger 108 has been connected, since the voltage of the −VO terminal 105 becomes lower than the voltage of the negative electrode 111 of the secondary cell, electrical charge current flows through a parasitic diode of the FET-A 112 to the secondary cell 101. That is, after the detection of the electrical over-discharge, electrical charge is possible though electrical discharge is disabled.

Although a switch circuit that replaces switch circuit 103 can be also realized using a single FET, to this end it is needed to change not only the gate potential but also the substrate potential of the FET. Unless this change is made, since there occurs a state where the source potential of the FET becomes higher than the drain potential thereof, control of the electrical charge/discharge operation that has been explained hereinbefore is impossible to perform. It is at the present time typical to control the electrical charge/discharge operation by the use of two FETs.

Figure 8:
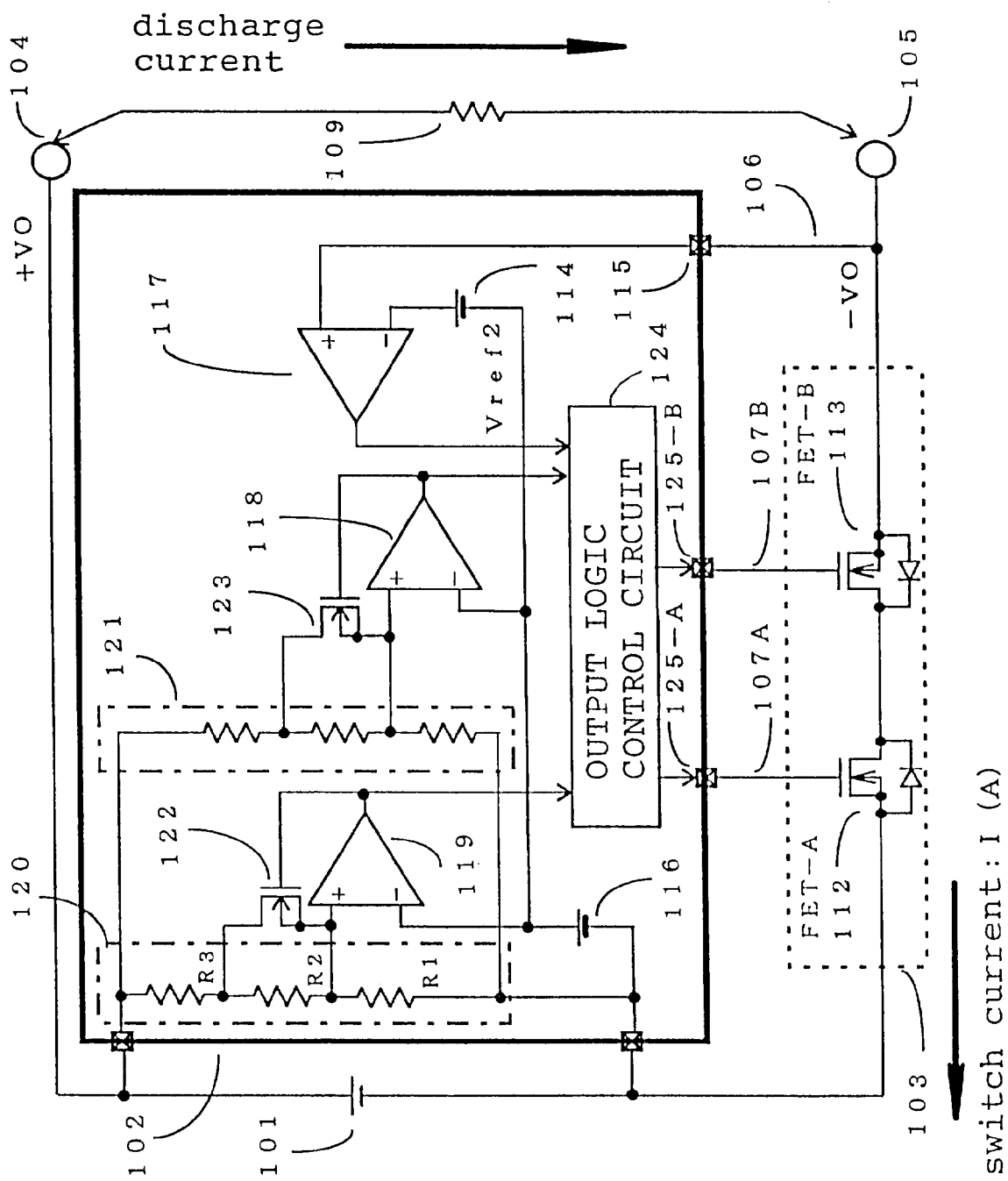
FIG. 8 is a view illustrating a state where a load has been connected when the charging type power-supply unit is in a state of overcharge.

Even if constructing the switch circuit 103 with the use of two FETS, when an abnormality occurs in the load (shorting of the external terminal, etc.) whereby the excess current state occurs wherein an excessive amount of current is consumed, detection of the current that flows through the switch circuit is possible. As illustrated in FIG. 8, since the serially connected FET-A 112 and FET-B 113 have FET resistances, in a case where current has flown through each FET, a voltage drop occurs there because of the resistance value thereof being finite though it is small. The charge/discharge control circuit 102 is depicted in more detail than in FIG. 3. This circuit is one which has been prepared by being considered from the conventional version for the purpose of explaining this embodiment. Where supplying current from the secondary cell 101 to the load 109 by the use of this control circuit, the voltage of the −VO terminal 105 becomes higher than the voltage of the negative electrode 111 of the secondary cell. This voltage drop is being monitored by the comparator 117, whereby the resulting voltage and the voltage of the reference voltage B 114 are compared with each other.

Conversely, where supplying current from the electrical charger 108 to the secondary cell 101, the voltage of the −VO terminal 105 becomes lower than the voltage of the negative electrode voltage 111 of the secondary cell.

Assuming that the voltage value of the reference voltage circuit B 114 is represented by Vref 2[V], the "on" resistance of the FET-B 113 is represented by Rfet [Ω] at which time the "on" resistance of the FET-A is the same as that of the FET-B, and the current that flows through these FETs is represented by I [A], $$I[A] >= (Vref\ 2[V]/2/Rfet\ [\Omega]) \quad (1)$$

This I [A] value becomes a requirement according to which the excess current is detected. When this equation holds true, the output of the comparator 117 turns High from Low, whereby the output logic circuit 124 having received this signal operates to turn the FET-A 112 "off".

In this way, even when constructing the switch circuit 103 by the use of two FETs, it is possible to stop the supply of the energy to the load connected to the +VO terminal 104 and the −VO terminal 105 by turning the switch circuit 103 "off" in the state of excess current. When considering the absolute maximum rated current and resistance value of a FET, I=4 A and Rfet=50 mΩ as the representative values. When substituting these values into the equation (1), it results that the Vref 2=0.4 V. That is, if the voltage at the excess current detecting terminal 106 is 0.4 V or more, the switch circuit is deemed as being in the state of excess current, with the result that the FET-A 112 is turned "off".

However, as stated above because of this excess current detecting function the connecting of the load in the state of overcharge results in the occurrence of a state of overcharge and excess current, and both the FET-A 112 and the FET-B 113 go "off" with the result that although the electrical charge is stopped, the electrical discharge with respect to the load is also interrupted.

Figure 9:
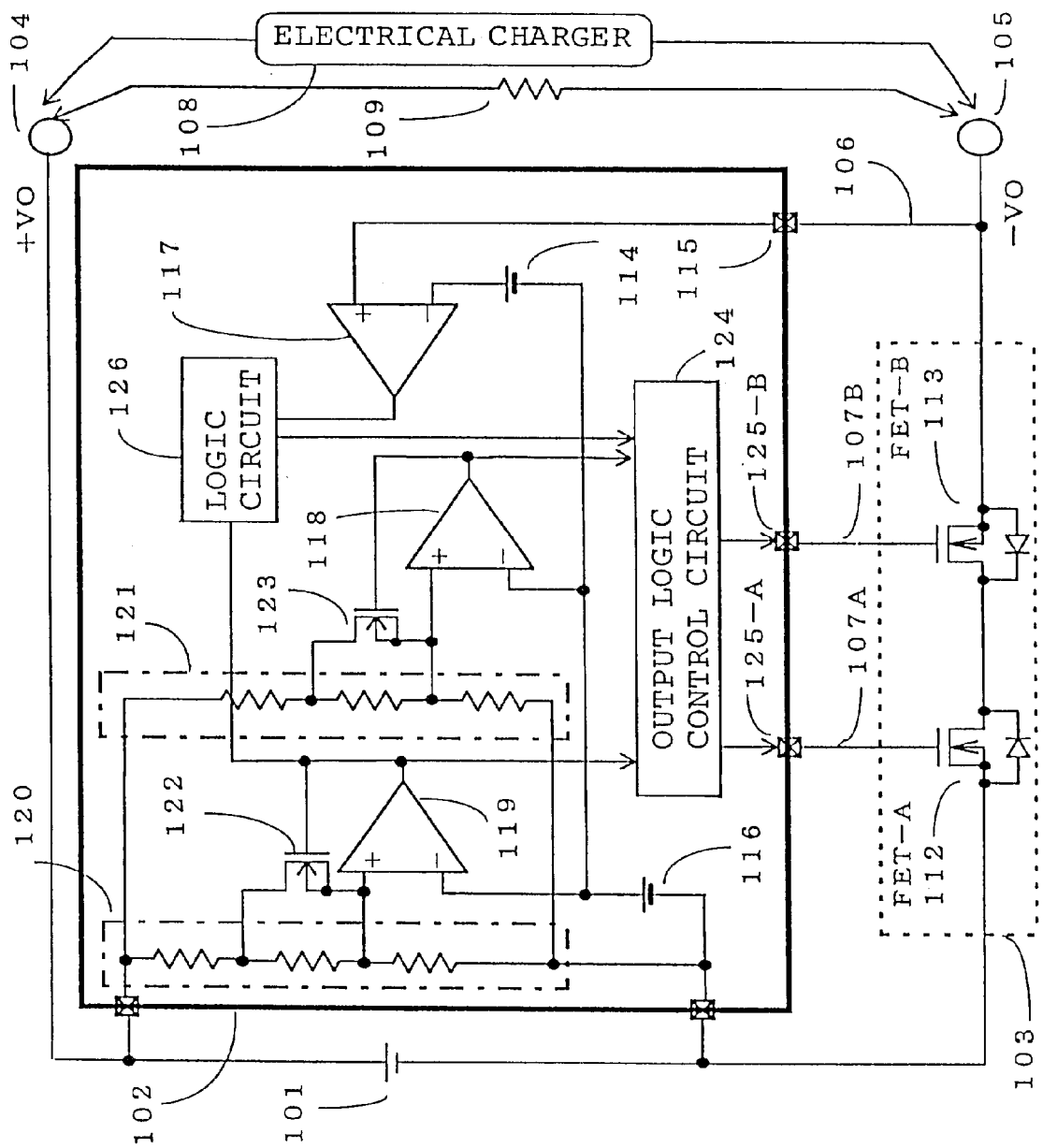
FIG. 9 is a circuit block diagram illustrating another example of the charging type power-supply unit.

On this account, as a method for avoiding the occurrence of this state and enabling the performance of the electrical discharge, a circuit that is illustrated in FIG. 9 can be considered. There is added as illustrated in FIG. 9 a logic circuit 126 which even when in the electrical overcharge protection state the load 109 has been connected (namely, excess current) does not turn the FET-A 112 "off". When in the electrical overcharge protection state the excess current has been detected, this logic circuit stops the excess current detecting function. Thus even in an electrical overcharge protection state when the load has been connected with the result that the voltage of the excess current detecting terminal 115 has become higher than the voltage Vf, the FET-A 112 is not turned "off" and electrical discharge current continues to flow through the parasitic diode of the FET-B 113.

Figure 10:
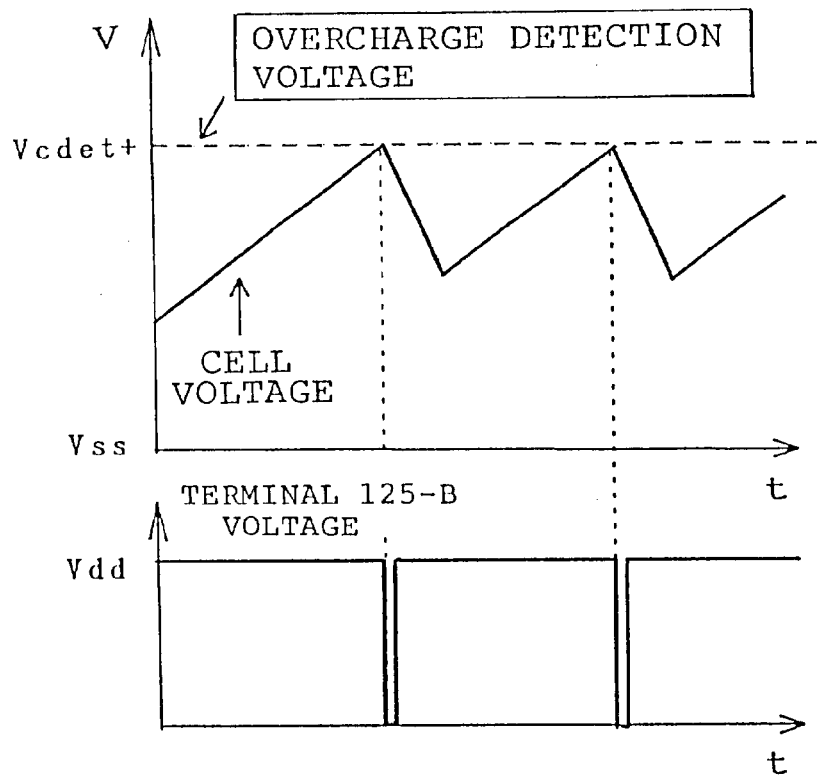
FIG. 10 is a view illustrating voltage waveforms that are generated when the secondary cell is charged in a case where no hysteresis circuit exists in the charging type power-supply unit.

However, with even the circuit of FIG. 9 there still remains the following problems. Here, such problems are explained using the voltage waveforms of FIG. 10. Assume that the voltage at which electrical overcharge detection has been made and the FET-B 113 is turned "off" to be an electrical overcharge detection voltage=Vcdet +. During the time period in which the secondary cell is being electrically charged the voltage of the secondary cell becomes this voltage value of Vcdet +, the FET-B 113 is turned "off", with the result that the electrical charge is stopped with the result that supply of the electrical charge current to the secondary cell is stopped. Since the secondary cell has an impedance therein, the cell voltage drops as a result of the electrical charge current having been stopped. For this reason, if it is determined according to only one overcharge detecting voltage whether the FET-B 113 is to be turned "on" or "off", the following problem arises. Since when having stopped the performance of the electrical charge by turning the FET-B 113 "off" the voltage of the secondary cell decreases down to the Vcdet + or lower, the FET-B 113 again goes "on". Since thereafter the electrical charge is again started with the result that the voltage of the secondary cell 101 increases whereby the same phenomenon occurs repeatedly, and the voltage of the overcharge control terminal 125-B oscillates. When such an oscillation is caused, the electrical charge control according to a normal voltage ceases to be performed, with the result that the charge/discharge control circuit ceases to perform its function.

Figure 11:
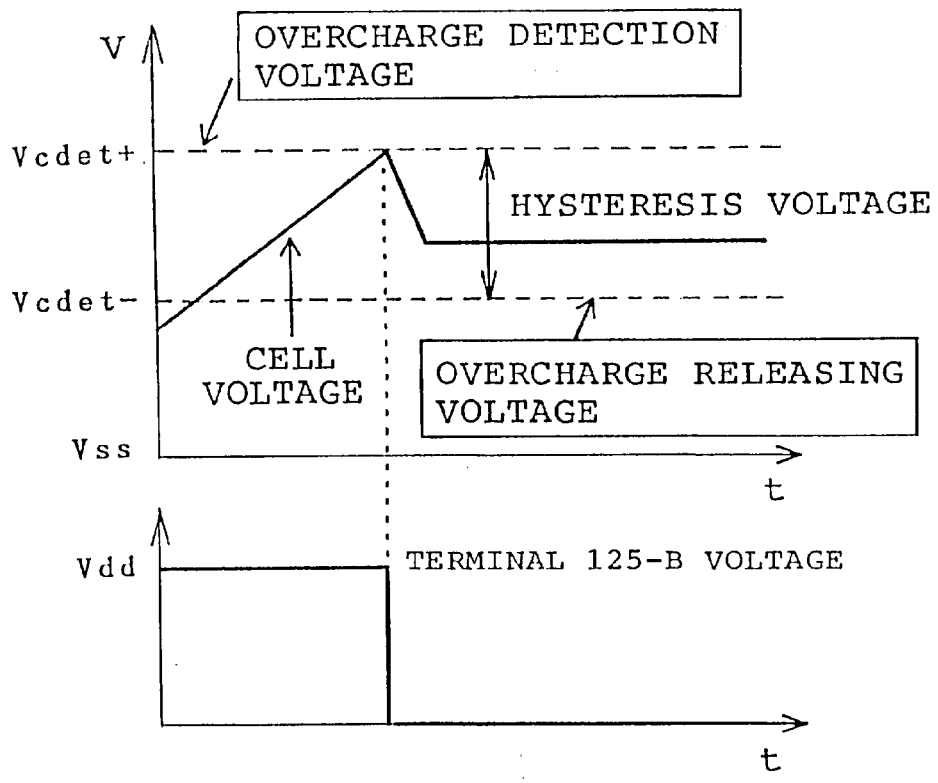
FIG. 11 is a view illustrating voltage waveforms that are generated when the secondary cell is charged in a case where a hysteresis circuit exists in the charging type power-supply unit.

In order to prevent the occurrence of this oscillation, it is necessary that the overcharge detecting voltage has a hysteresis. The hysteresis means a characteristic in which when the voltage rises and has exceeded the level of the detecting voltage, this detecting voltage falls. That is, a circuit that involves the hysteresis therein is one in which the detecting voltage that prevails when the voltage rises and the detecting voltage that prevails when the voltage decreases after having exceeded the former detecting voltage differ from each other. The voltage difference between the detecting voltage that prevails when the voltage rises and the detecting voltage that prevails when the voltage falls is referred to as "a hysteresis voltage". As illustrated in FIG. 11, it is assumed that the voltage that is lowered from the overcharge detecting voltage by the hysteresis voltage be an overcharge releasing voltage (Vcdet −). Since after initial detection of the overcharge the detecting voltage becomes the Vcdet −, even when the cell voltage decreases thereafter, the FET does not go "off" again. Therefore, the oscillation ceases to occur. That is, in the charge/discharge control circuit for the secondary cell, the hysteresis function is indispensable.

Figure 12:
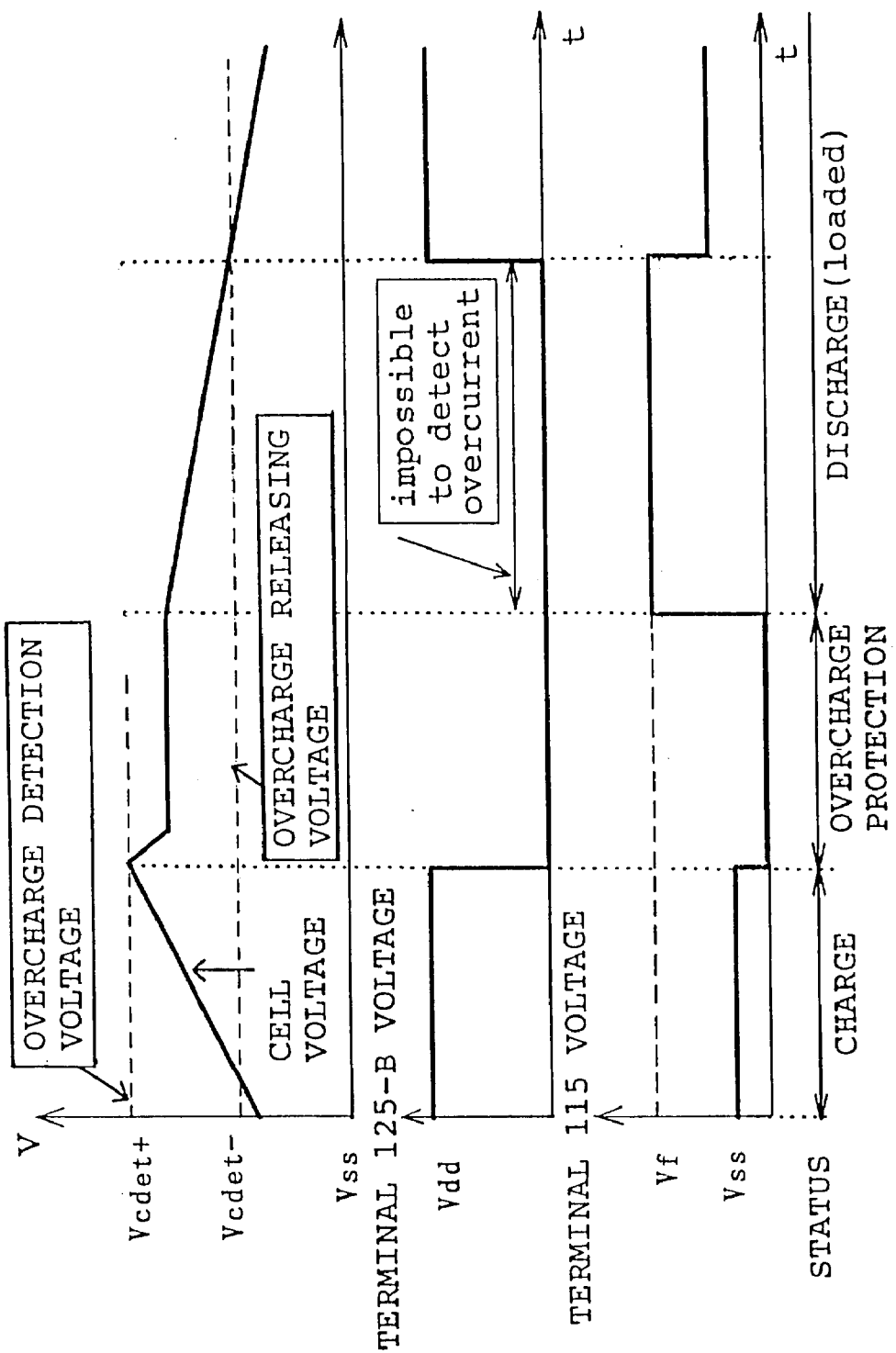
FIG. 12 illustrates voltage waveforms that are generated when the secondary cell is charged and discharged in a case where a hysteresis circuit exists in the charging type power-supply unit.

Since as mentioned above the charge/discharge control circuit has the hysteresis function, when in the overcharge protection state the load has been connected, the following problem exists with the embodiment of FIG. 9. In FIG. 12 there are illustrated the terminal voltage waveforms of the terminals 125-B and 115 that are generated in the embodiment of FIG. 9. When after the detection of the electrical overcharge the load has been connected, the current flows through the parasitic diode of the FET-B 113 and in consequence the voltage of the terminal 115 becomes higher than the Vf voltage. Even when this voltage is higher than the excess cur-rent detecting voltage (reference voltage B 114), since the embodiment of FIG. 9 has a circuit construction for stopping the flow of the excess current, whatever amount the load current may flow, the electrical discharge cannot be stopped until the cell voltage decreases down to the overcharge releasing voltage (Vcdet −). Especially, in an environment such as that wherein the internal impedance of the secondary cell is low and therefore the overcharge releasing voltage (Vcdet −) is low, even when a larger amount of load current than necessary flows (namely, even when the voltage of the −VO terminal 105 appreciably rises), the electrical discharge becomes impossible to stop.

Since as has been explained above during this time period the electrical discharge is not stopped with respect to the flow of even an excessive amount of current, abnormal current also continues to flow through the FETs as well, potentially resulting in the FETs being thermally damaged. In a case where the parts such as the FETs are thermally damaged, normal electrical charge/discharge control is impossible to perform unless they are replaced. In addition, in the worst case, the FETs, secondary cell or mounted substrate may cause a fire due to shorting of the external terminal, etc.

Also, even if the FETs are not thermally damaged, since the load current continues to flow through the parasitic diode of the FET-B 113 until the voltage of the secondary cell decreases down to the overcharge releasing voltage (Vcdetc −), the loss is made there. Due to this loss, the service life of the secondary cell shortens. Furthermore, since the current that flows into the load is limited by the parasitic diode, when equipment has been connected to the secondary cell in the state of overcharge protection, the load current is limited in magnitude. In an environment wherein the load current is limited in this way, there also arises the problem that it takes a significantly large amount of time to start the equipment or starting thereof becomes rendered ineffective.

Figure 2:
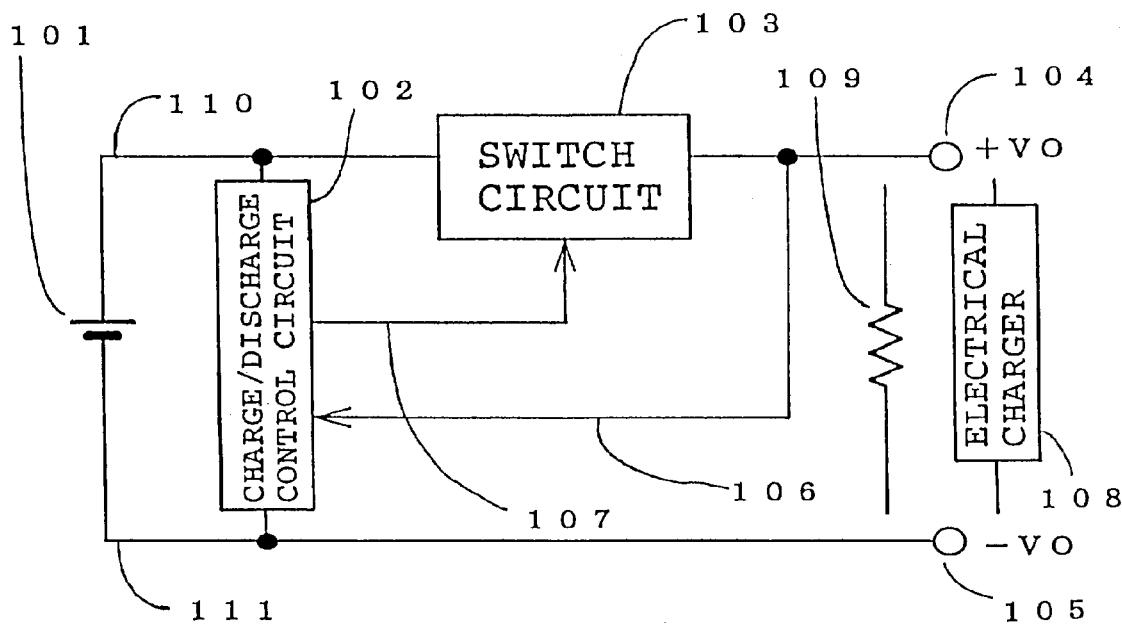
FIG. 2 is an explanatory view illustrating circuit blocks of a conventional charging type power-supply unit.
Figure 3:
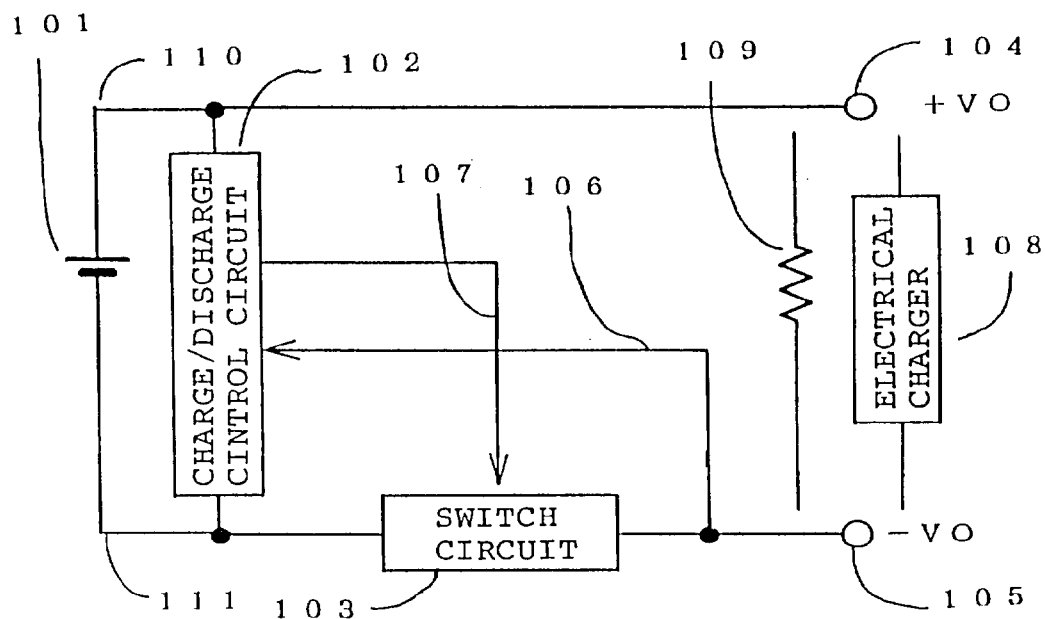
FIG. 3 is a circuit block diagram illustrating another example of the conventional charging type power-supply unit.
Figure 4:
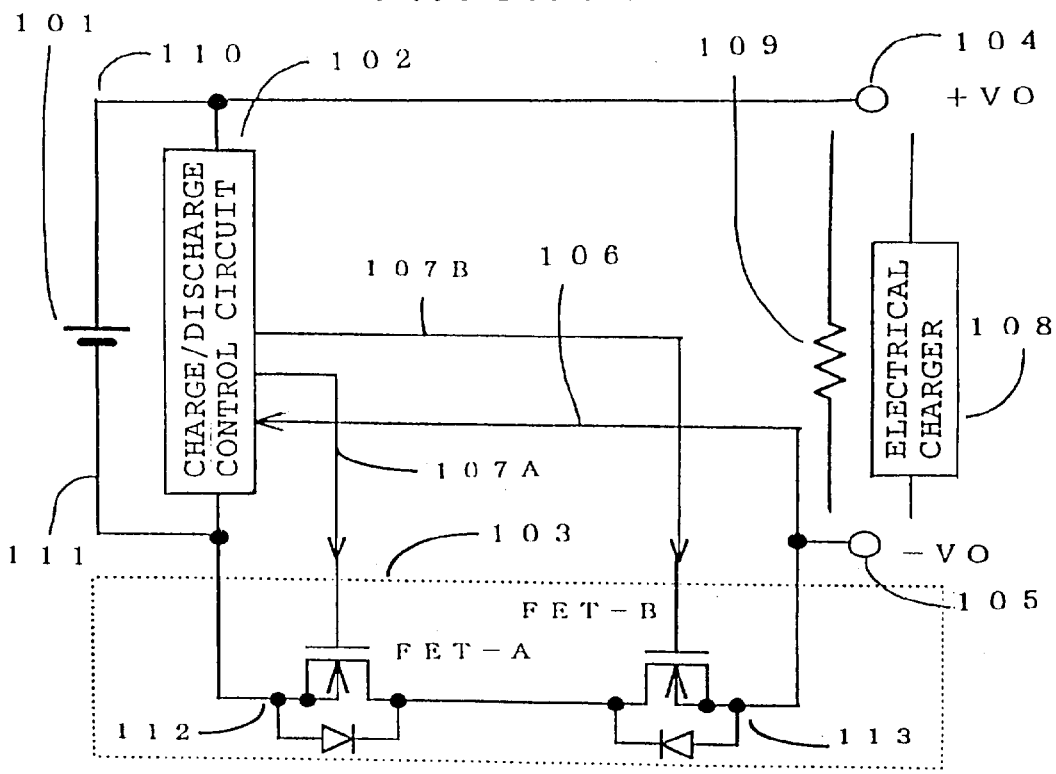
FIG. 4 is a circuit block diagram illustrating another example of the conventional charging type power-supply unit.
Figure 5:
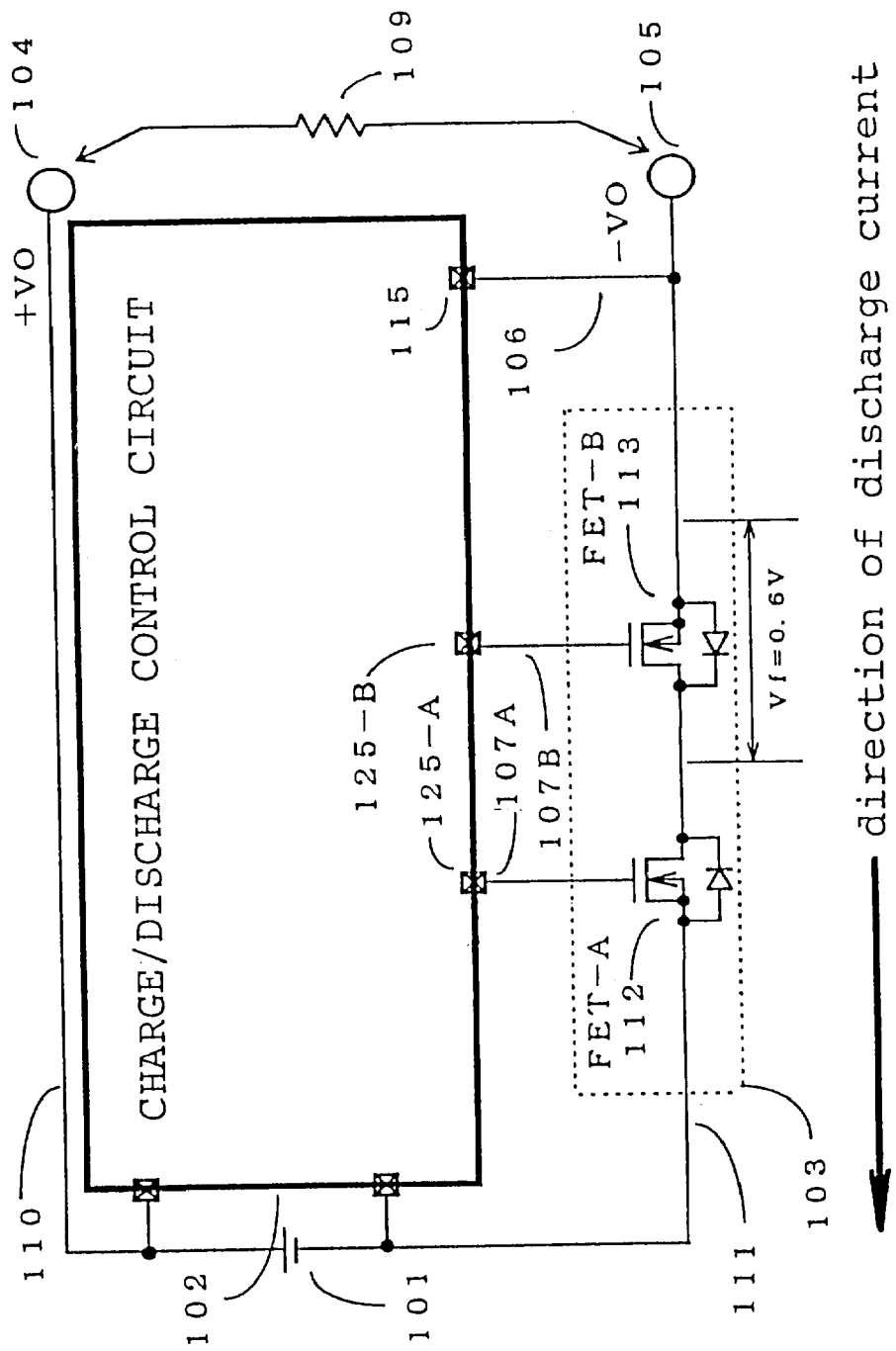
FIG. 5 is a view illustrating a state where a load has been connected when the conventional charging type power-supply unit is in a state of overcharge.

Although the explanation that has hereinbefore been made has been given in connection with the circuit that corresponds to FIG. 3, the thus far explained contents are completely the same with respect to the circuit of FIG. 2. That is, if the switch circuit 103 is constructed using two Pch-FETs and the charge/discharge control circuit is modified into a circuit that can control the "on"/"off" state of the Pch-FETs, the operation becomes completely the same.

In the circuit of FIG. 1, this problem is totally solved. As stated previously, when the output of the overcharge detecting comparator 119 is inverted from Low to High, the hysteresis circuit A 122 operates (the transistor goes "on"). In this embodiment, to the voltage dividing circuit A 120 there is connected this circuit, the circuit that is connected therewith being explained hereafter. It is assumed that at this time the reference voltage A 116 has a voltage level of V ref1 and the voltage dividing circuit A 120 comprises four resistors connected in series with each other, and that the resistors are R1 to R4 as illustrated in FIG. 1, respectively, and the resistance values thereof are r1 to r4, respectively. In an initial state, the voltage of the secondary cell 101 is low, the output of the overcharge detecting comparator 119 is Low, the hysteresis circuit A 122 is "off" (the transistor is "off"), and the hysteresis circuit C 127 is "on" (the transistor is "on"). The voltage (Vcdet +) at which the electrical overcharge is to be detected in this state is expressed by the following equation.

$$(r1+r2+r3)/r1 \times Vref1 \qquad (2)$$

When the output of the overcharge detecting comparator 119 becomes High once in this state, since the hysteresis circuit A 122 is turned "on" (the transistor is turned "on"), the resistor R2 becomes equivalent to a circuit that has been shorted. At this time, the hysteresis circuit C 127 is turned "on" (the transistor is turned "on"). The detecting voltage (Vcdet −) is expressed by the following equation.

$$(r1+r3)/r1 \times Vref1 \qquad (3)$$

As expressed by the equations (2) and (3), Vcdet +>Vcdet −. When the detection occurs once, the voltage at which the output voltage of the overcharge detecting comparator 119 becomes High again is set to be low. For this reason, even if at the time of the electrical overcharge being detected the electrical charge current is stopped with the result that the voltage of the secondary cell decreases due to the influence of the internal impedance thereof, no oscillation phenomenon occurs. Although the circuit for setting the hysteresis circuit is not limited to that according to this embodiment and can be prepared according to various methods, any one of these methods makes it possible to construct a charge/discharge control circuit that is similar to that according to the present invention.

When the state of overcharge has occurred, the charge/discharge control circuit 102 operates to turn the switch circuit 103 "off". The switch circuit 103 is composed of two FETs and in this figure there are used Nch-FETs. When the electrical overcharge has been detected, the FET-B 113 is turned "off" and therefore the electrical charge is inhibited. However, when the load has been connected, the electrical discharge current flows through the parasitic diode of the FET-B 113. In other words, when in the overcharge protection state the load is connected between the +VO terminal 104 and the −VO terminal 105, current is supplied from the secondary cell 101 to the load.

Next, the operation that is performed when the electrical over-discharge is detected will be explained. Basically, this operation is the same as that which is performed when the electrical overcharge is detected. When electrical discharge from the secondary cell 101 to the load 109 continues to be performed and as a consequence the voltage of the secondary cell 101 decreases down to the over-discharge detecting voltage level or lower, the voltage of the plus input terminal of the over-discharge detecting comparator 118 becomes lower than the voltage of the reference voltage A 116, with the result that the output of the comparator 118 is inverted from High to Low. The output signal from the comparator 118 is also input to the output control logic circuit 124. Therefore, when the output of the over-discharge detecting comparator 118 is inverted to Low, the gate voltage of the FET-A 112 that constitutes the switch circuit 103 is also inverted to Low. As a result of this, since the FET-A 112 goes "off", the electrical discharge current ceases to be supplied from the secondary cell 101, whereby the electrical discharge with respect to the load is stopped. At a time when the electrical over-discharge is detected, also, the cell voltage changes due to the influence of the internal impedance of the secondary cell. Conversely to the time of the electrical overcharge being detected, when the electrical discharge is stopped, the cell voltage rises. For this reason, in order to prevent the occurrence of the oscillation at the time of detection of the electrical over-discharge, when the electrical over-discharge is detected once, the voltage at which the electrical over-discharge is released is so set as to become higher than this over-discharge detecting voltage. In this embodiment, the hysteresis circuit B 123 is connected to the voltage dividing circuit B 121.

Since as illustrated in FIG. 1 the −VO terminal 105 is connected to the charge/discharge control circuit 102 by way of the signal line 106, when there occurs the excess current state where an excessive amount of current is consumed by the load, it is possible to stop the continuation of the electrical discharge. As has been explained using FIG. 7, since the switch circuit 103 wherein two FETs are connected in series with each other has a resistance, when current flows therethrough, a voltage drop occurs at the −VO terminal 105. That is, the voltage of the −VO terminal 105 becomes higher than the voltage of the negative terminal 111 of the secondary cell 101. The comparator 117 compares this terminal voltage with the voltage of the reference voltage B 114. The relational expression at this time is already expressed by the equation (1). When the equation (1) holds true, the output of the comparator 117 becomes High from Low and the resulting signal is input to the output logic control circuit 124, whereby the FET-A 112 is turned "off". As a result, supply of the energy to the load is stopped. If it is desired to change the current value according to which the electrical discharge is stopped, it is sufficient to change the voltage of the reference voltage B 114.

Here, a state that occurs when the cell is electrically charged and the electrical overcharge has been detected will be explained. Since the state is the electrical overcharge state, the output of the overcharge detecting comparator 119 is High, whereupon the output logic circuit 124 at this time outputs a signal so as for the gate voltage of the FET-B 113 to become Low. In this state, electrical charge with respect to the secondary cell is stopped. Here, the electrical charger 108 finishes its role and is demounted from the −VO terminal 105 and +VO terminal 104.

Figure 13:
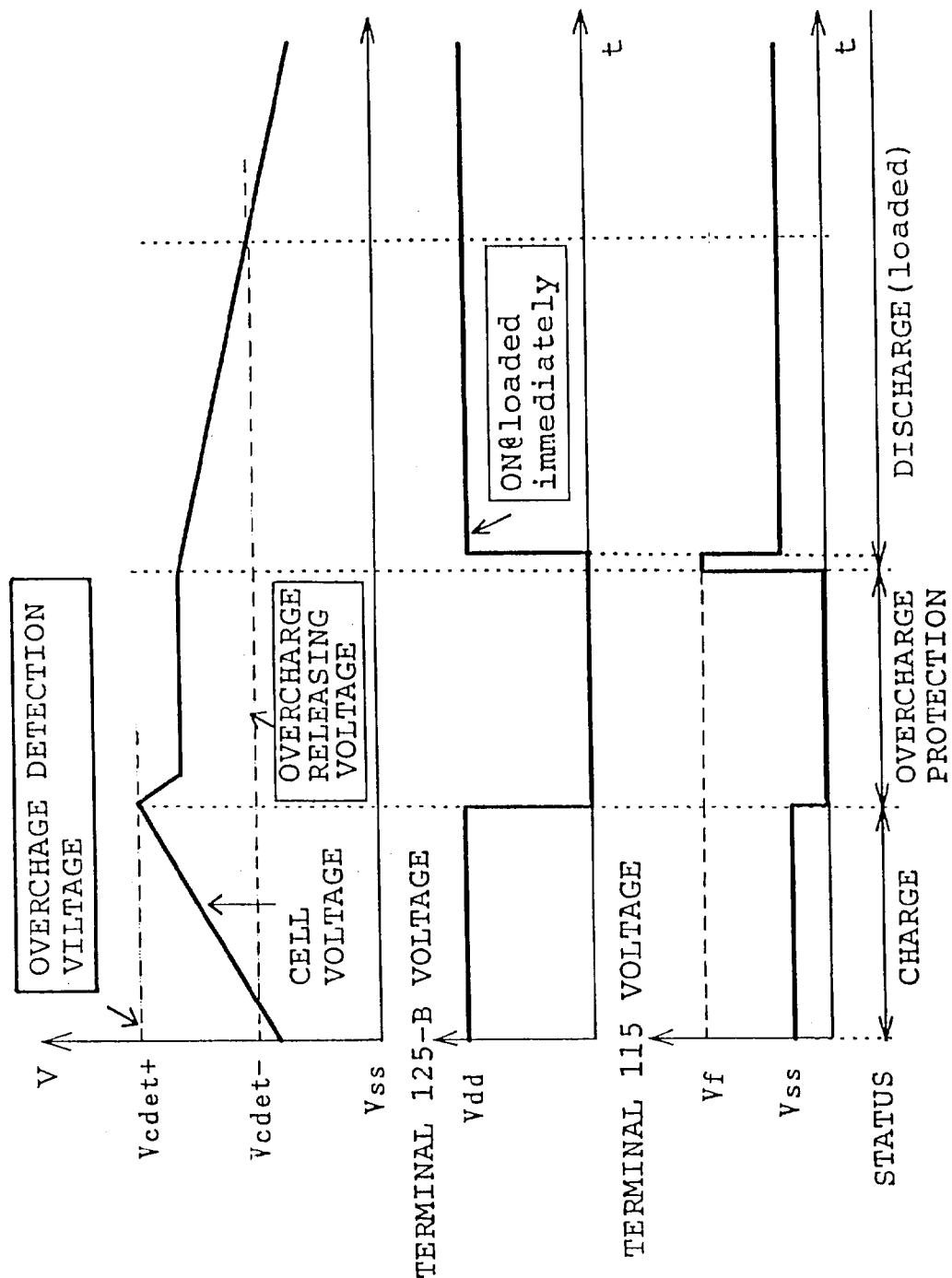
FIG. 13 illustrates voltage waveforms that are generated when the secondary cell is charged and discharged in the charging type power-supply unit according to the present invention.

Next, the thus-electrically-charged secondary cell is connected as a matter of course to the load. The voltage waveform in this embodiment that prevails at this time is illustrated in FIG. 13. While the load is connected to the −VO terminal 105 and +VO terminal 104, since at this time the FET-B 113 is being made "off", current flows through the parasitic diode. At this moment, the voltage of the −VO terminal 105 necessarily becomes higher by the forward voltage Vf of the parasitic diode than the voltage of the negative electrode 111 of the secondary cell. In the circuit of FIG. 1, the voltage of this −VO terminal 105 is being monitored by the charge/discharge control circuit 102 and, if the voltage of the reference voltage B 114 is lower than the Vf voltage, the output of the excess current detecting comparator 117 is inverted. This output signal is input not only to the output control logic circuit 124 but also to the logic circuit 126. The logic circuit 126 is also controlling the detecting voltage for detecting the electrical overcharge current voltage. When as in a state which is now being explained the excess current has been detected, the logic circuit 126 operates to turn the hysteresis circuit C 127 from "on" to "off". At this time, the electrical overcharge detecting voltage is expressed as follows and this voltage is represented by Vdetp.

$$(r1+r3+r4)/r1 \times Vref1 \qquad (4)$$

In the voltage that is expressed by the equation (4), the r4 is so set that this voltage may become higher than the electrical overcharge detecting voltage (Vcdet +). The waveform at this time is illustrated in FIG. 13. By this setting, since the voltage of the secondary cell is necessarily lower than the Vcdet + voltage, the output of the overcharge detecting comparator 119 changes from High to Low. As a result of the comparator output being changed, the FET-B 113 becomes "on", with the result that the current from the secondary cell is supplied to the load without being passed through the parasitic diode. Also, since due to the FET-B 113 being turned "on" there occurs no voltage drop that corresponds to the forward voltage Vf of the diode, the voltage of the −VO terminal 115 also becomes low and the excess current detection also is simultaneously released.

In even a state where the hysteresis C 127 has functioned (the transistor has changed from an "on" state to an "off" state) as mentioned above, when the excess current has occurred, the switch circuit is made "off" whereby the electrical discharge with respect to the load is stopped. Through the operation that has been hereinbefore explained, the FET-A 112 and the FET-B 113 are both being "on" and, since the output of the overcharge detecting comparator 119 is Low, the hysteresis A 122 is in an "off" state. As stated previously, when the excess current has occurred, the voltage of the −VO terminal 105 becomes higher than the voltage of the reference voltage B 114 due to a voltage drop resulting from the "on" resistance of the switch circuit 103, with the result that the output of the excess current detecting comparator 117 becomes High from a Low state. Although at this time the hysteresis circuit C 127 becomes "off", this raises no problem. While the electrical overcharge detecting voltage becomes higher than Vcdet + through the operation of the hysteresis circuit C 127, since the secondary cell is in a state of electrical discharge, the voltage thereof is necessarily below the Vcdet +voltage, with the result that even if the detecting voltage changes to the higher detecting voltage, the output voltage of the comparator does not change from its Low state. When the load is being connected, no electrical charge is performed with the result that no problem arises operationally.

Although when the excess current has occurred at a time of the cell voltage having become lower than the electrical overcharge releasing voltage Vcdet − also the hysteresis circuit operates, since at this time also the cell voltage is necessarily below the electrical overcharge detecting voltage Vcdet +, no problem arises in this case as well.

When the load 109 is disconnected and the electrical charger 108 is connected, since the voltage of the −VO terminal 105 becomes lower than the voltage of the negative electrode 111 of the secondary cell, the excess current detecting operation is not performed and the hysteresis circuit C 127 is always in an "off" state and therefore the electrical overcharge detecting operation is performed according to the voltage of the secondary cell. The electrical overcharge detecting voltage is expressed by the equation (1) or (2) according to the level of the cell voltage.

The circuitry according to this embodiment does not influence every environment wherein the secondary cell is used as has been explained above and thus settles the problems that are inherent in the conventional circuitry.

Figure 14:
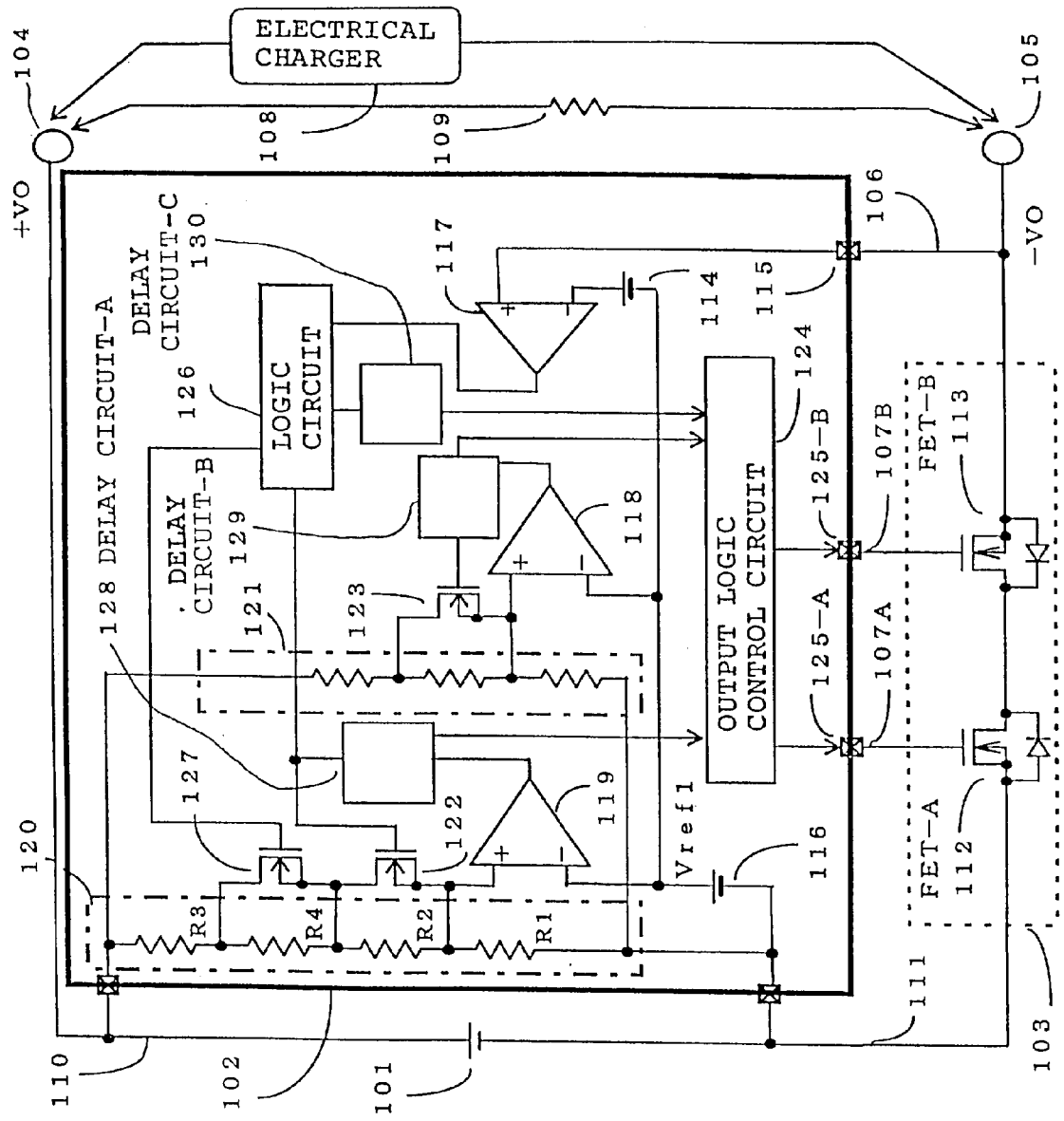
FIG. 14 is a circuit block diagram illustrating another example of the charging type power-supply unit according to the present invention.

Another embodiment of the present invention is illustrated in FIG. 14. Respective outputs of the overcharge detecting comparator 117, over-discharge detecting comparator 118 and excess current detecting comparator 119 are input to a delay circuit A 128, a delay circuit B 129 and a delay circuit C 130, respectively. By this construction, it becomes possible to make each detecting operation have a time delay. The remaining construction is the same as that which is illustrated in FIG. 1.

When the electrical charger that applies a high voltage the moment it has been connected to the secondary cell is connected thereto, it results that the moment the electrical charger has been connected the voltage of the secondary cell exceeds the electrical overcharge detecting voltage Vcdet +. In this state, the electrical overcharge detecting operation of the charge/discharge control circuit 102 is performed, whereby the switch circuit 103 is inconveniently made "off". However, the secondary cell is almost not electrically charged from the state of its being before the electrical charger is connected to it. Also, when the voltage of the secondary cell rises or the voltage of the +VO terminal 104 rises due to the noises from the outside, also, the same phenomenon occurs. On this account, in order to avoid the occurrence of such a phenomenon, the delay circuit A 128 is connected to the output of the overcharge detecting comparator 119. When at a certain point in time a noise has been generated and within a period of time delay has vanished, although the output of the overcharge detecting comparator 119 is inverted, the output of the delay circuit A 128 is not inverted. Therefore, at this time, the electrical overcharge detecting function ceases to work, with the result that the reliability of the product is enhanced.

When detecting the electrical over-discharge, also, there occurs completely the same phenomenon. It sometimes happens that the moment the load has been connected, the voltage of the secondary cell falls under the electrical over-discharge detecting voltage. In this state, the electrical over-discharge detecting function of the charge/discharge control circuit 102 works with the result that the switch circuit 103 is inconveniently made "off". However, the secondary cell is almost not electrically discharged from the state of its being before the load is connected to it. The occurrence of this phenomenon can also be settled by connecting the delay circuit B 129 to the output of the over-discharge detecting comparator 118.

Also, when the load has a large capacitative component, it is possible to enhance the reliability by making the excess current detecting operation have a time delay. When a large capacitor whose charge has been completely discharged has been connected to the secondary cell, an appreciably high magnitude of current is generated. If the capacitance value is large, the time length during which a high magnitude of current continues to be supplied from the secondary cell to the capacitor becomes also large. When at this time the excess current detecting function works, it results that supply of the current to the load is inconveniently stopped. On this account, with respect to the excess current detection, also, adding the delay circuit C 130 to the output of the excess current detecting comparator 117 through the logic circuit 126 is means that is effective for enhancing the reliability as in the case of the electrical overcharge and over-discharge detections.

In the charge/discharge control circuit of FIG. 14 which is equipped with the above-mentioned delay circuits, also, there is the same effect as that which has been explained previously, with the result that the present invention is valid.

Figure 15:
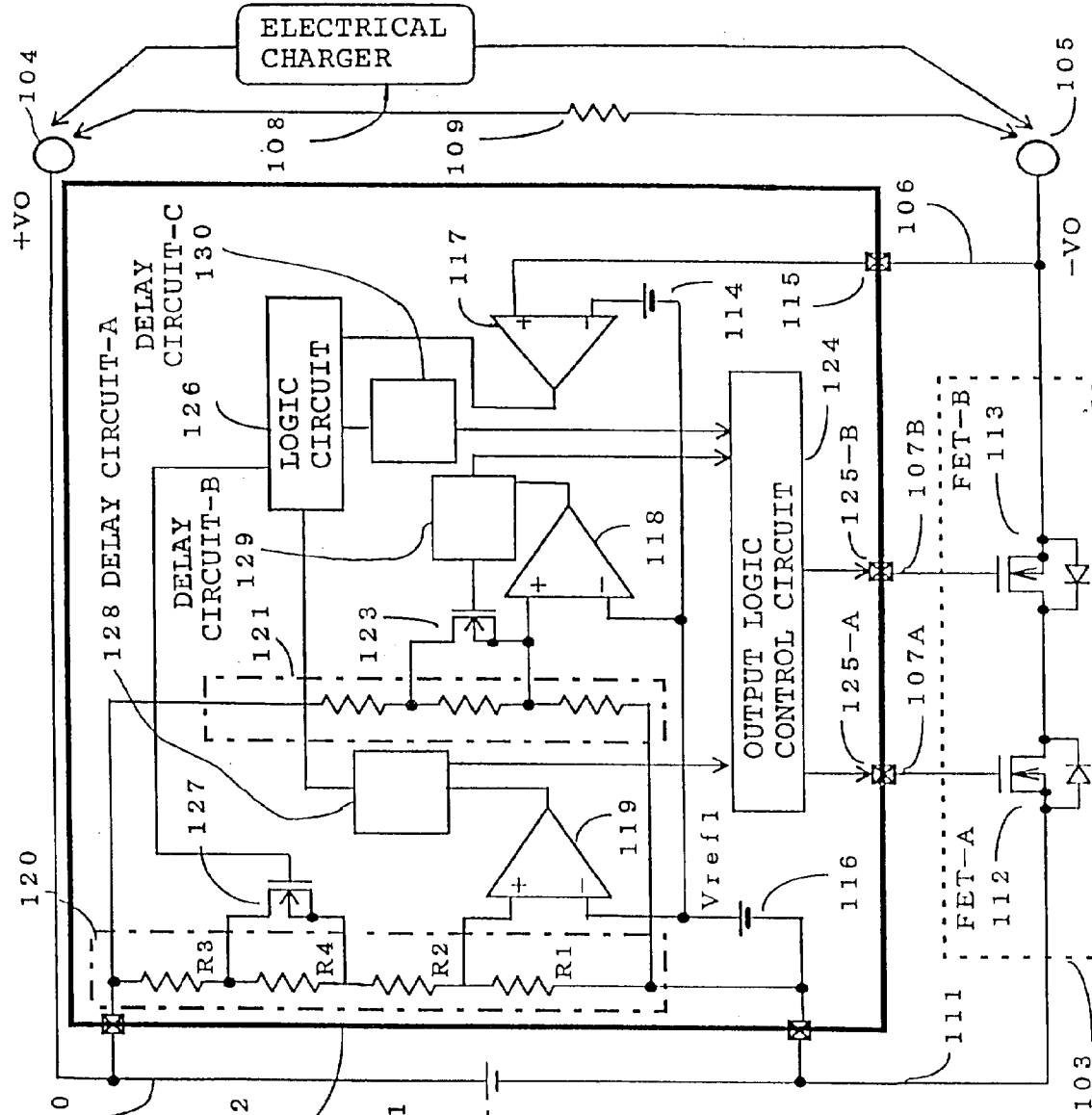
FIG. 15 is a circuit block diagram illustrating another example of the charging type power-supply unit according to the present invention. And, FIG. 16 is a circuit block diagram illustrating another example of the charging type power-supply unit according to the present invention.

As another embodiment, there is also a circuit that is illustrated in FIG. 15. This circuit is one which has been prepared by removing the hysteresis circuit A 122 from the circuit illustrated in FIG. 14. However, in a case where there exists no hysteresis circuit A 122, at the time of the electrical overcharge detection the oscillation phenomenon occurs as has been explained previously. Although in the case of the embodiment of FIG. 15 also there is the likelihood that the oscillation occurs when detecting the electrical overcharge, since the delay circuit A 128 is connected to the overcharge detecting comparator, the cyclic period of the oscillation becomes the length of the time delay of this delay circuit A 128. If this cyclic period of the oscillation, i.e., the length of the time delay is sufficiently long, the secondary cell can resist the performance of the electrical charge and in addition the detection of the electrical overcharge also is performed according to a prescribed value of electrical overcharge detecting voltage.

In even this case as well, the present invention is valid.

Figure 16:
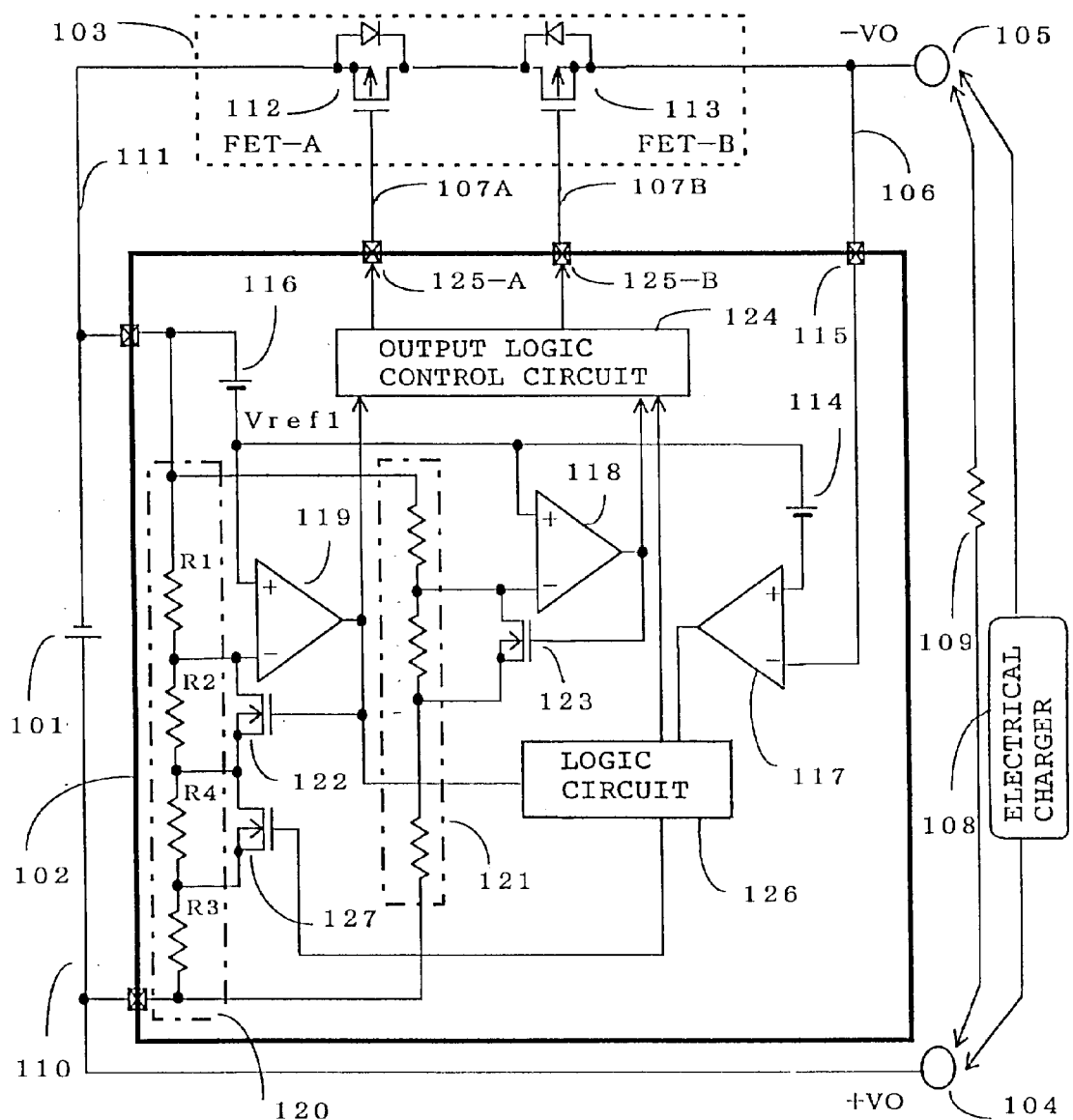

A circuit that is obtained when the switch circuit 103 according to this embodiment is constructed using Pch-FETs is illustrated in FIG. 16. The internal blocks of the charge/discharge control circuit 102 are modified from those in the embodiment of FIG. 1. It is apparent that the circuit operates in completely the same way as has been explained hereinbefore. Also, it is also included in the scope of the present invention to add to this circuit the delay circuit A 127, delay circuit B 128 and delay circuit C 129 such as those which are employed in FIG. 14. Also, the switch circuit 103 that is included in the constructional example of FIG. 14 can also be constructed using Pch-FETs. Further, it is also possible as a matter of course to construct the switch circuit 103 included in the embodiment of FIG. 15 by the use of Pch-FETs.

Although in the embodiments described hereinabove it has been explained to control the electrical charging and discharging of a single secondary cell, even when a plurality of the secondary cells have been connected in series with one another, the relevant circuit can be readily constructed if modification is so made that the voltage of each cell can be detected by the charge/discharge control circuit 102, at which time also the present invention is valid.

Further, if there is made a circuit construction of, in the electrical overcharge state, detecting that the load is connected and, at this time, elevating the electrical overcharge detecting voltage, the object of the present invention can be achieved and therefore it is not necessary that the resulting circuit be one which is completely the same as that in each of the present embodiments.

Although in each of the present embodiments the charge/discharge control circuit has been constructed using a CMOS (Complementary Metal Oxide Semiconductor) circuit, it is also possible to construct it by using bipolar transistors and it is easy to realize this construction.

As has been explained above, in the present invention, since with a simple circuit when in the electrical overcharge state the load has been connected the connection of this load is detected to thereby release the electrical overcharge state, it becomes possible to perform electrical discharging with respect to the load with no use of the parasitic diode of the switch circuit, whereby it is possible to effectively supply the current from the secondary cell to the load, with the result that the service life of the secondary cell becomes prolonged without being followed by a rise in the cost of the product. Also, when an abnormality (e.g., shorted state) occurs in the load and in consequence an excessive amount of current has flown thereinto, the circuit functions so as to immediately make the switch circuit "off", with the result that there is no problem such as breakage of the switch circuit due to the heat generated therein and therefore there is the effect that the product has an enhanced level of reliability and safety.

What is claimed is:

1. A rechargeable power-supply unit comprising:

a secondary cell;

external power-supply terminals connected to the secondary cell and being connectable to a load for supplying power to the load and to a charging device for charging the secondary cell;

a switch circuit connected in series between the secondary cell and at least one of the external power-supply terminals; and a charge/discharge control circuit connected in parallel with the secondary cell for monitoring a voltage of the secondary cell, for controlling the switch circuit to disconnect the secondary cell from the charging device when the voltage of the secondary cell is above an overcharge detection voltage which indicates that the secondary cell is in an overcharged state, and for increasing the overcharge detection voltage when an external load is connected to the secondary cell after a determination is made that the secondary cell is in an overcharged state, so that a reduction in voltage of the secondary cell due to an internal impedance thereof does not cause oscillation of the charge/discharge control circuit.

2. A rechargeable power-supply unit comprising: a switch circuit; a secondary cell connected in series with the switch circuit; external power-supply terminals connected in series with the secondary cell and the switch circuit; and a charge/discharge control circuit connected in parallel with the secondary cell to control the switch circuit to selectively open and close the switch circuit to connect and disconnect the secondary cell from the external power-supply terminals; wherein the charge/discharge control circuit includes means for opening the switch circuit to disconnect the secondary cell from an external load when the voltage of the secondary cell has become lower than a predetermined overdischarge detection voltage and the secondary cell is in an overdischarged state, and in an overcurrent state when an excessive amount of current is flowing through the switch circuit, to thereby stop electrical discharge from the secondary cell to the external load, and means for opening the switch circuit to disconnect the secondary cell from an external electrical charger when the voltage of the secondary cell has become hither than a predetermined overcharge detection voltage and the secondary cell is in an overcharged state to thereby stop the external electrical charger from charging the secondary cell, and means for closing the switch circuit to connect the secondary cell to the external load and increasing the value of the overcharge detection voltage when, during an overcharged state of the secondary cell, the external load has been connected thereto.

3. A charge/discharge control circuit used in a rechargeable power-supply unit, the charge/discharge control circuit comprising:

an overcharge detection portion for determining whether the state of electrical charge of a secondary cell is an overcharged state by comparing the voltage of the secondary cell connected to the charge/discharge control circuit with a predetermined overcharge detection voltage;

an over-discharge detection portion for determining whether the state of electrical discharge of the secondary cell is an overdischarged state by comparing the voltage of the secondary cell with a predetermined over-discharge detection voltage;

an overcurrent detection portion for determining an overcurrent state by comparing the current discharged from the secondary cell with a predetermined overcurrent detection current; and an overcharge detection voltage setting circuit for increasing the overcharge detection voltage after an overcurrent state of the secondary cell has been detected when a load is connected to the secondary cell.

4. A charge/discharge control circuit used in a rechargeable power-supply unit, the charge/discharge control circuit comprising:

an overcharge detection portion for determining whether the state of electrical charge of a secondary cell is an overcharged state by comparing the voltage of the secondary cell connected to the charge/discharge control circuit with a predetermined overcharge detection voltage;

an over-discharge detection portion for determining whether the state of electrical discharge of the secondary cell is an overdischarged state by comparing the voltage of the secondary cell with a predetermined over-discharge detection voltage;

an overcurrent detection portion for determining an overcurrent state by comparing the current discharged from the secondary cell with a predetermined overcurrent detection current;

a first delay circuit for delaying an output signal of the overdischarge detection portion;

a second delay circuit for delaying an output signal of the over-discharge detection portion;

a third delay circuit for delaying an output signal of the excess current detection portion;

an overcharge detection voltage setting circuit for setting the predetermined overcharge detection voltage based on an output signal from the first delay circuit and an output signal from the overcurrent detection portion;

an over-discharge detection voltage setting circuit for setting the predetermined over-discharge detection voltage based on an output signal of the second delay circuit; and an output control logic circuit for outputting a control signal to an external switch circuit according to the output signals from the first, the second and the third delay circuits.

5. A rechargeable power-supply unit comprising a secondary cell, a switch circuit connected between a terminal of the secondary cell and an external power supply terminal, and the charge/discharge control circuit as claimed in claim 4; wherein the charge/discharge control circuit detects the voltage of the secondary cell and outputs to the switch circuit a control signal for controlling the charge current from an external charger to the secondary cell and the discharge current to be supplied to an external load.

* * * * *